United States Patent
Guo et al.

(10) Patent No.: US 12,267,506 B2
(45) Date of Patent: Apr. 1, 2025

(54) SMOOTHED DIRECTIONAL AND DC INTRA PREDICTION

(71) Applicant: Apple Inc., Cupertino, CA (US)

(72) Inventors: Mei Guo, San Jose, CA (US); Jun Xin, San Jose, CA (US); Hsi-Jung Wu, San Jose, CA (US); Alexandros Tourapis, Los Gatos, CA (US); Krishnakanth Rapaka, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/837,846

(22) Filed: Jun. 10, 2022

(65) Prior Publication Data

US 2022/0303554 A1 Sep. 22, 2022

Related U.S. Application Data

(62) Division of application No. 16/834,693, filed on Mar. 30, 2020, now Pat. No. 11,388,419.

(Continued)

(51) Int. Cl.
*H04N 19/159* (2014.01)
*H04N 19/176* (2014.01)
*H04N 19/182* (2014.01)

(52) U.S. Cl.
CPC ......... *H04N 19/159* (2014.11); *H04N 19/176* (2014.11); *H04N 19/182* (2014.11)

(58) Field of Classification Search
CPC ... H04N 19/159; H04N 19/176; H04N 19/182
(Continued)

(56) References Cited

U.S. PATENT DOCUMENTS

2004/0207642 A1  10/2004  Crisu et al.
2011/0280304 A1  11/2011  Jeon et al.
(Continued)

FOREIGN PATENT DOCUMENTS

CN    1774727 A    5/2006
CN  102301720 A   12/2011
(Continued)

OTHER PUBLICATIONS

Shengsheng Yu, Yi Gao, Jiazhong Chen, Jingli Zhou, "Distance-based Weighted Prediction for H.264 Intra Coding", International Conference on Audio, Language and Image Processing, Shanghai, 2008 (Year: 2008).*

(Continued)

*Primary Examiner* — Fabio S Lima
(74) *Attorney, Agent, or Firm* — BakerHostetler

(57) ABSTRACT

Techniques are disclosed for deriving prediction pixel blocks for use in intra-coding video and combined inter- and intra-coding video. In a first aspect, the techniques may include deriving value(s) for pixel location(s) of the prediction pixel block by, when a prediction direction vector assigned to the prediction vector points to quadrants I or III of a Cartesian plane, deriving the pixel location's value from pixel values in two regions of previously-decoded pixel data intercepted by extending the prediction direction vector in two opposite directions through the pixel location. When the prediction direction vector points toward quadrants II of the Cartesian plane, deriving the pixel location's value from pixel values in one region intercepted by the prediction direction vector through the pixel location, and from a second region intercepted by a vector that is orthogonal to the prediction direction vector.

21 Claims, 10 Drawing Sheets

Related U.S. Application Data

(60) Provisional application No. 62/970,359, filed on Feb. 5, 2020.

(58) Field of Classification Search
USPC .................................................. 375/240.16
See application file for complete search history.

(56) References Cited

U.S. PATENT DOCUMENTS

| | | |
|---|---|---|
| 2011/0293001 A1 | 12/2011 | Lim et al. |
| 2012/0020580 A1 | 1/2012 | Sasai et al. |
| 2013/0272405 A1* | 10/2013 | Jeon ....................... H04N 19/11 |
| | | 375/240.15 |
| 2016/0156904 A1 | 6/2016 | Yasugi et al. |
| 2017/0078697 A1* | 3/2017 | Lee ........................ H04N 19/70 |
| 2017/0272757 A1 | 9/2017 | Xu et al. |
| 2018/0176595 A1* | 6/2018 | Park ....................... H04N 19/11 |
| 2018/0288425 A1 | 10/2018 | Panusopone et al. |
| 2019/0089980 A1 | 3/2019 | Jeon et al. |
| 2019/0110052 A1 | 4/2019 | Liu et al. |
| 2020/0296417 A1* | 9/2020 | Ko ......................... H04N 19/11 |
| 2021/0105464 A1 | 4/2021 | Choi et al. |

FOREIGN PATENT DOCUMENTS

| | | |
|---|---|---|
| CN | 103563370 A | 2/2014 |
| CN | 110072112 A | 7/2019 |

OTHER PUBLICATIONS

"Series H: Audiovisual and Multimedia Systems—Infrastructure of audiovisual services—Coding of moving video"; High efficiency video coding; ITU-T; H.265; Feb. 2018; 692 pages.

* cited by examiner

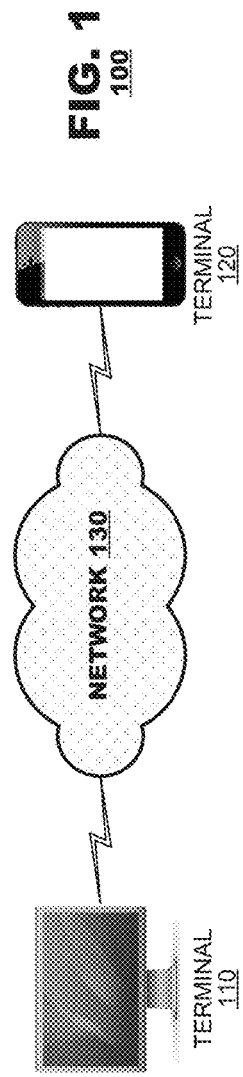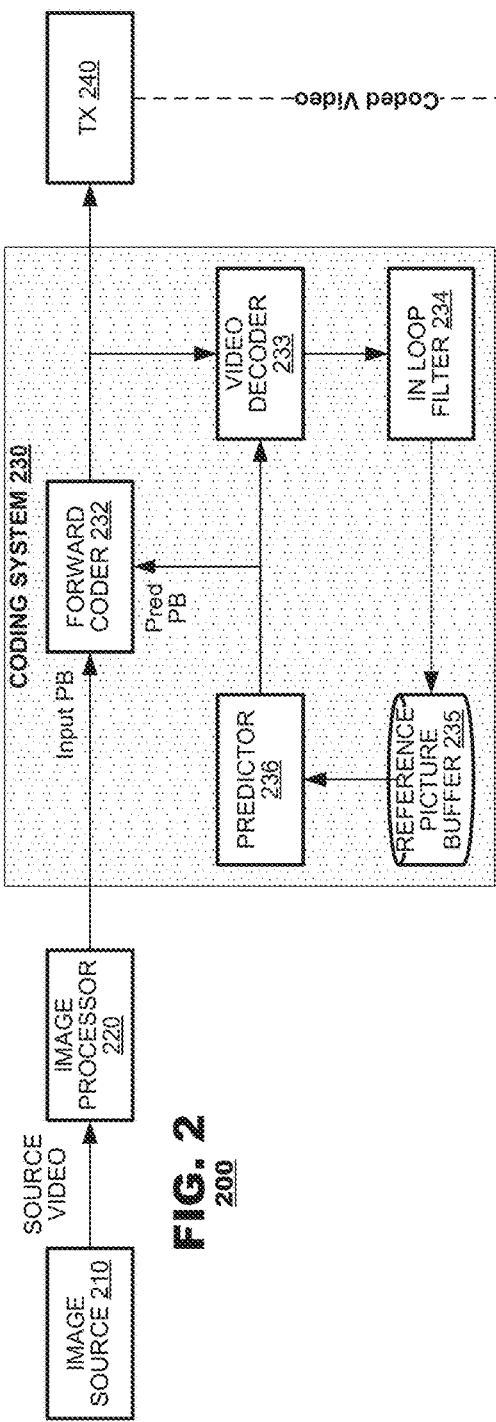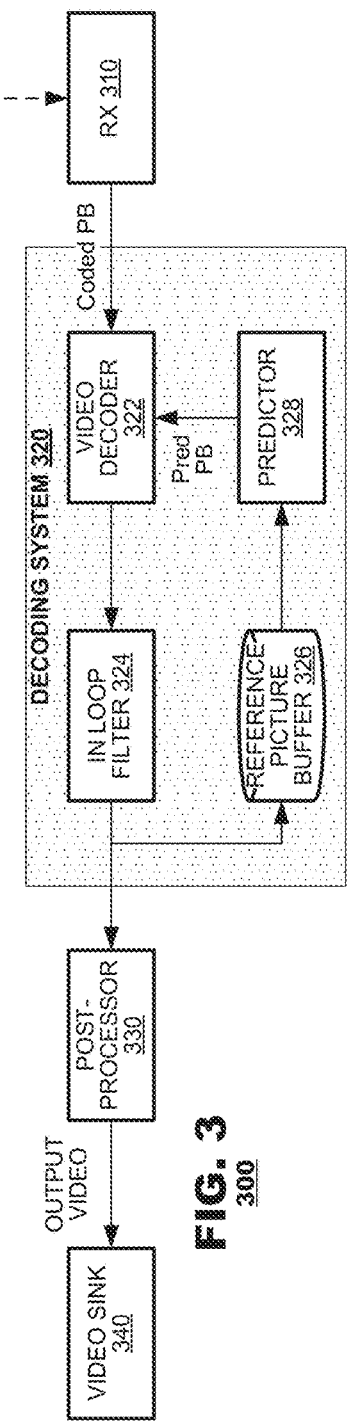

400

1700

1800

1900

SMOOTHED DIRECTIONAL AND DC INTRA PREDICTION

CROSS REFERENCE TO RELATED APPLICATIONS

This application is a Divisional of U.S. patent application Ser. No. 16/834,693, filed on Mar. 30, 2020, now allowed, which claims the benefit of priority under 35 USC 119(e) of U.S. provisional application No. 62/970,359, filed on Feb. 5, 2020.

BACKGROUND

The present disclosure relates to digital image coding, image coding with intra-prediction, and video coding with combined inter- and intra-prediction.

Traditional image and video coding schemes commonly employ techniques such as prediction, computing a residual from the prediction, transform and quantization of the residual, in-loop filtering, and entropy coding to produce a compressed bitstream. Prediction may occur in several modes. In intra-coding modes, input data is coded differentially with respect to image data from a common frame, which already has been coded. The previously coded data may be decoded and, therefore, is available as a source of prediction. Inter-coding modes code input data differentially with respect to previously coded and decode image data from other frames. Intra-coding and inter-coding both are employed in many prevalent coding protocols.

BRIEF DESCRIPTION OF THE DRAWINGS

FIG. 1 illustrates an example simplified block diagram of an image delivery system.

FIG. 2 is a functional block diagram of an encoding terminal according to an aspect of the present disclosure.

FIG. 3 is a functional block diagram of a decoding terminal according to an aspect of the present disclosure.

DETAILED DESCRIPTION

Figure 4:
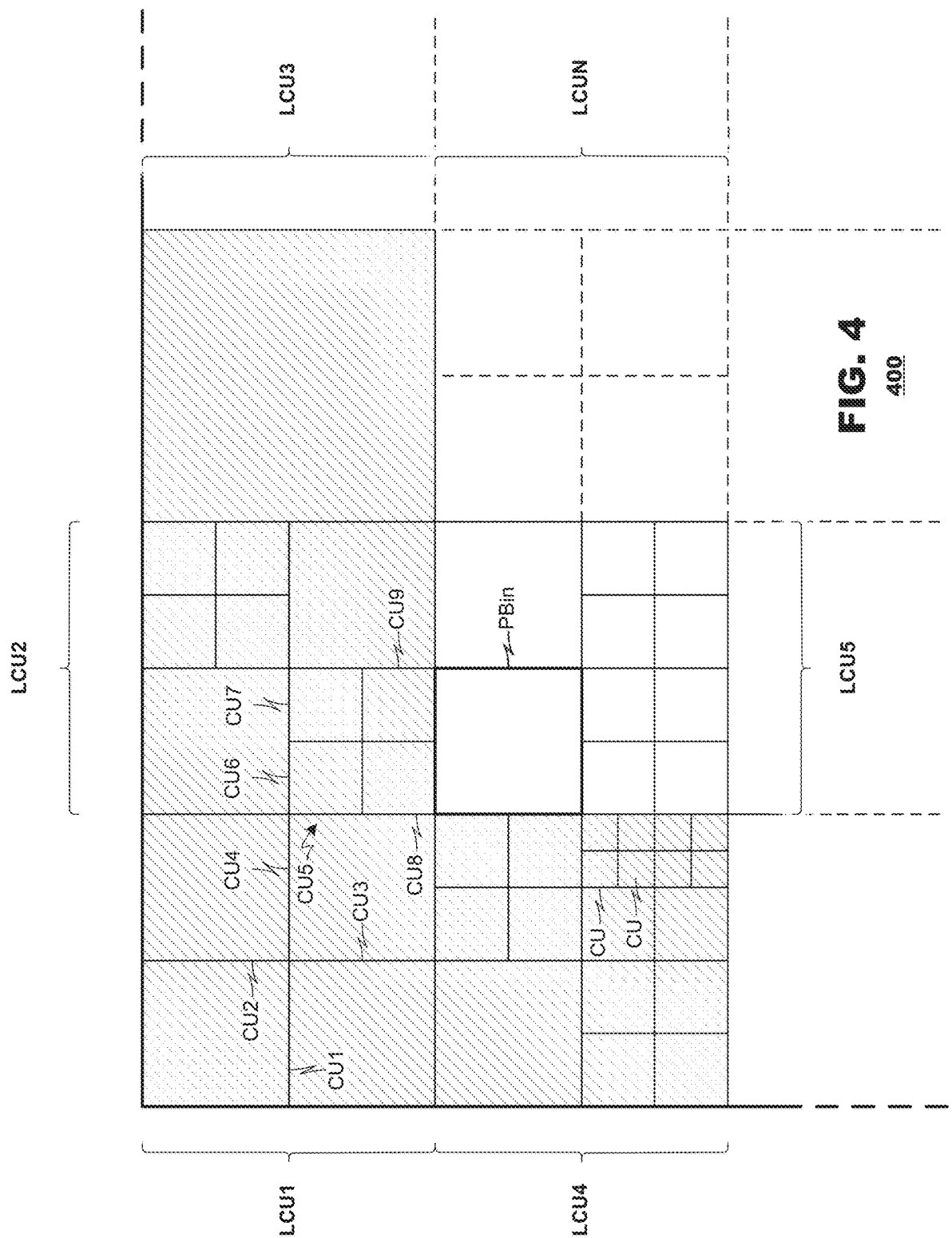
FIG. 4 illustrates an exemplary frame suitable for use with an aspect of the present disclosure.

Aspects of the present disclosure provide improved techniques for deriving prediction pixel blocks using spatial (i.e., intra) prediction methods for use in coding of image and/or video data. These techniques may include deriving value(s) for pixel location(s) of the prediction pixel block by, when a prediction direction vector assigned to the prediction vector points to quadrants I or III of a Cartesian plane, deriving the pixel location's value from pixel values in two regions of previously-decoded pixel data intercepted by extending the prediction direction vector in two opposite directions through the pixel location. When the prediction direction vector points toward quadrants II of the Cartesian plane, deriving the pixel location's value from pixel values in one region intercepted by the prediction direction vector through the pixel location, and from a second region intercepted by a vector that is orthogonal to the prediction direction vector. The input pixel block may be coded differentially with reference to the predicted pixel block so derived. In an aspect, this spatial prediction methods may be combined with inter prediction methods for a multi-hypothesis prediction mode.

In another aspect, pixel values for a prediction pixel block may be derived from a predicted DC value of the prediction pixel block and at least one source pixel selected from a region of previously-decoded pixel data closest to the pixel location. For example, for locations in the pixel block nearest to a top edge of the prediction pixel block, the source pixel may be selected as a pixel in a bottom-most row of previously decoded pixel data in a common column as the pixel location. And, for locations in the prediction pixel block closest to a left edge of the prediction pixel block, the source pixel may be selected as a pixel in a right-most column of previously decoded pixel data in a common row as the pixel location. The input pixel block may be coded differentially with reference to the predicted pixel block so derived.

FIG. 1 illustrates a simplified block diagram of a video delivery system 100 according to an aspect of the present disclosure. The system 100 may include a plurality of terminals 110, 120 interconnected via a network. The terminals 110, 120 may code video data for transmission to their counterparts via the network. Thus, a first terminal 110 may capture video data locally, code the video data and transmit the coded video data to the counterpart terminal 120 via a channel. The receiving terminal 120 may receive the coded video data, decode it, and render it locally, for example, on a display at the terminal 120. If the terminals are engaged in bidirectional exchange of video data, then the terminal 120 may capture video data locally, code the video data and transmit the coded video data to the counterpart terminal 110 via another channel. The receiving terminal 110 may receive the coded video data transmitted from terminal 120, decode it, and render it locally, for example, on its own display. The processes described herein may operate coding of on both frame pictures and interlaced field pictures but, for simplicity, the present discussion will describe the techniques in the context of integral frames.

A video coding system 100 may be used in a variety of applications. In a first application, the terminals 110, 120 may support real time bidirectional exchange of coded video to establish a video conferencing session between them. In another application, a terminal 110 may code pre-produced video (for example, television or movie programming) and store the coded video for delivery to one or, often, many downloading clients (e.g., terminal 120). Thus, the video being coded may be live or pre-produced, and the terminal 110 may act as a media server, delivering the coded video according to a one-to-one or a one-to-many distribution model. For the purposes of the present discussion, the type of video and the video distribution schemes are immaterial unless otherwise noted.

In FIG. 1, the terminals 110, 120 are illustrated as a personal computer and a smart phone, respectively, but the principles of the present disclosure are not so limited. Aspects of the present disclosure also find application with various types of computers (desktop, laptop, and tablet computers), computer servers, media players, dedicated video conferencing equipment, and/or dedicated video encoding equipment. Many techniques and systems described herein, such as the terminals 110 and 120 of video coding system 100, may operate on still images as well as video.

The network 130 represents any number of networks that convey coded video data between the terminals 110, 120, including for example wireline and/or wireless communication networks. The communication network may exchange data in circuit-switched or packet-switched channels. Representative networks include telecommunications networks, local area networks, wide area networks, and/or the Internet. For the purposes of the present discussion, the architecture and topology of the network are immaterial to the operation of the present disclosure unless otherwise noted.

FIG. 2 is a functional block diagram illustrating components of an encoding terminal 200 according to an aspect of the present disclosure. The encoding terminal may include a video source 210, an image processor 220, a coding system 230, and a transmitter 240. The video source 210 may supply video to be coded. The video source 210 may be provided as a camera that captures image data of a local environment, a storage device that stores video from some other source or a network connection through which source video data is received. The image processor 220 may perform signal conditioning operations on the video to be coded to prepare the video data for coding. For example, the preprocessor 220 may alter the frame rate, frame resolution, and/or other properties of the source video. The image processor 220 also may perform filtering operations on the source video.

The coding system 230 may perform coding operations on the video to reduce its bandwidth. Typically, the coding system 230 exploits temporal and/or spatial redundancies within the source video. For example, the coding system 230 may perform motion compensated predictive coding in which video frame or field pictures are parsed into sub-units (called "pixel blocks," for convenience), and individual pixel blocks are coded differentially with respect to predicted pixel blocks, which are derived from previously-coded video data. A given pixel block may be coded according to any one of a variety of predictive coding modes, such as:
- intra-coding, in which an input pixel block is coded differentially with respect to previously coded/decoded data of a common frame;
- single prediction inter-coding, in which an input pixel block is coded differentially with respect to data of a previously coded/decoded frame; and
- multi-hypothesis motion compensation predictive coding, in which an input pixel block is coded predictively using previously decoded data from two or more sources, via temporal and/or spatial prediction.

The predictive coding modes may be used cooperatively with other coding techniques, such as Transform Skip coding, reduced-resolution update (RRU) coding, scaling of prediction sources, palette coding, and the like.

The coding system 230 may include a forward coder 232, a decoder 233, an in-loop filter 234, a picture buffer 235, and a predictor 236. The coder 232 may apply the differential coding techniques to the input pixel block using predicted pixel block data supplied by the predictor 236. The decoder 233 may invert the differential coding techniques applied by the coder 232 to a subset of coded frames designated as reference frames. The in-loop filter 234 may apply filtering techniques to the reconstructed reference frames generated by the decoder 233. The picture store 235 may store the reconstructed reference frames for use in prediction operations. The predictor 236 may select a prediction mode and reference and then derive prediction data for input pixel blocks from within the reference frames stored in the picture store. When intra-mode coding is selected, the predictor 236 may select a prediction reference from a current frame. When multi-hypothesis coding is selected, predictor 236 may combine multiple prediction references from within the current frame and/or other reference frames.

The transmitter 240 may transmit coded video data to a decoding terminal via a channel.

FIG. 3 is a functional block diagram illustrating components of a decoding terminal 300 according to an aspect of the present disclosure. The decoding terminal may include a receiver 310 to receive coded video data from the channel, a video decoding system 320 that decodes coded data, a post-processor 330, and a video sink 340 that consumes the output video data.

The receiver 310 may receive a data stream from the network and may route components of the data stream to appropriate units within the terminal 300. Although FIGS. 2 and 3 illustrate functional units for video coding and decoding, terminals 110, 120 (FIG. 1) often will include coding/decoding systems for audio data associated with the video and perhaps other processing units (not shown). Thus, the receiver 310 may parse the coded video data from other elements of the data stream and route it to the video decoder 320.

The video decoding system 320 may perform decoding operations that invert coding operations performed by the coding system 230. The video decoder may include a decoder 322, an in-loop filter 324, a picture buffer 326, and a predictor 328. The decoder 322 may invert the differential coding techniques applied by the coder 232 to the coded frames working on a pixel-block by pixel-block basis. The in-loop filter 324 may apply filtering techniques to reconstructed frame data generated by the decoder 322. For example, the in-loop filter 324 may perform various filtering operations (e.g., de-blocking, de-ringing filtering, sample adaptive offset processing, and the like). The filtered frame data may be output from the decoding system. The reference picture buffer 326 may store reconstructed reference frames for use in prediction operations. The predictor 328 may derive prediction data for input pixel blocks from within the current frame and/or reference frames stored by the reference picture buffer according to prediction reference data provided in the coded video data.

The post-processor 330 may perform operations to condition the reconstructed video data for display. For example, the post-processor 330 may perform various filtering operations (e.g., de-blocking, de-ringing filtering, and the like), which may obscure visual artifacts in output video that are generated by the coding/decoding process. The post-processor 330 also may alter resolution, frame rate, color space, etc. of the reconstructed video to conform it to requirements of the video sink 340.

The video sink 340 represents various hardware and/or software components in a decoding terminal that may consume the reconstructed video. The video sink 340 typically may include one or more display devices on which reconstructed video may be rendered. Alternatively, the video sink 340 may be represented by a memory system that stores the reconstructed video for later use. The video sink 340 also may include one or more application programs that process the reconstructed video data according to controls provided in the application program. In some aspects, the video sink may represent a transmission system that transmits the reconstructed video to a display on another device, separate from the decoding terminal; for example, the reconstructed video generated by a notebook computer may be transmitted to a large flat panel display for viewing.

The foregoing discussion of the encoding terminal and the decoding terminal (FIGS. 2 and 3) illustrates operations that are performed to code and decode video or still image data in a single direction between terminals, such as from terminal 110 to terminal 120 (FIG. 1). In applications where bidirectional exchange of video is to be performed between the terminals 110, 120, each terminal 110, 120 will possess the functional units associated with an encoding terminal (FIG. 2) and each terminal 110, 120 will possess the functional units associated with a decoding terminal (FIG. 3). Indeed, in certain applications, terminals 110, 120 may exchange multiple streams of coded video in a single direction, in which case, a single terminal (say terminal 110) will have multiple instances of an encoding terminal (FIG. 2) provided therein. Such implementations are fully consistent with the present discussion.

FIG. 4 illustrates an exemplary frame 400 that may be coded by a coding terminal 200 as in FIG. 2. The frame 400 is illustrated as having been parsed into pixel blocks according to a recursive quad-tree partitioning process, which is common, for example, in the ITU-T H.265/HEVC, AV1, and VVC (versatile video coding) coding protocols. In this scheme, the frame 400 first is parsed into an array of largest coding units (LCU1-LCUN) (called "LCUs" or coding tree units "CTUs" in some situations). Each LCU may be parsed further into coding units ("CUs") based on an analysis of image content within the LCU. In this example, LCU1 is shown having been parsed into four coding units, each occupying ¼$^{th}$ of the area of LCU1 CUs may be parsed into smaller CUs based, again, on the CU's image content. For example, FIG. 4 illustrates a coding unit CU5, parsed into four other coding units CU6-CU9. The partitioning process may continue as necessary, partitioning CUs into an array of four smaller CUs until coding until a preprocessor 220 determines from image content that further partition is not necessary or until coding units are generated at a smallest coding unit size supported by a coding system 230. The forward coder 230 may perform video coding on the coding units generated therefrom, treating them as pixel blocks as discussed herein.

The principles of the present disclosure also find application with pixel blocks that are generated from other partitioning protocols. For example, coding systems 230 operating according to the ITU-T H.261, H.262/MPEG-2, H.263, H.264/AVC, H.265/HEVC, VVC and AV1 coding protocols partition frames into macroblocks and further into blocks. The macroblocks/CTUs and/or blocks may be coded according to the techniques discussed herein as pixel blocks.

FIG. 4 illustrates an example of a raster-scan coding operation as applied to frame 400. A coding system 230 typically codes the pixel blocks in a coding pipeline in a raster scan order. As applied to the pixel blocks illustrated in FIG. 4, the coding system 230 may code LCU1 first, which involves coding all coding units CU1-CU4 contained within LCU1. The coding system 230 may advance to LCU2, coding all the CUs within LCU2. In the example illustrated in FIG. 4, LCU2 contains ten CUs having different sizes. The coding system advances to LCU3, which is shown as not having been parsed into smaller CUs. Thereafter, the coding system 230 advances to LCU4 and codes all the CUs contains within it.

In this example, by the time the coding process reaches LCU5, all coding units from LCU1-LCU4 will have been coded by the coding system 230. The coding system 230 will have generated decoded representations of the coding units from LCU1-LCU4. Thus, an input pixel block PBin from LCU5 may be coded predictively with reference to decoded image content generated from any of LCUs LCU1-LCU4. Decoded pixel data in spatial regions from LCU1-LCU4 will be available for use in deriving a predicted pixel block corresponding to PBin.

An analogous operation may be performed at a decoder. A decoding system 320 (FIG. 3) may decode coded video data in the same raster-scan order as the coding system 230 generated coded video data. Thus, by the time a decoding system 320 decodes a coded representation of the input pixel block PBin, the decoding system 320 already will have decoded content from the LCUs LCU1-LCU4. The decoded pixel data in spatial regions from LCU1-LCU4 will be available for use in deriving a predicted pixel block corresponding to PBin.

Figure 5:
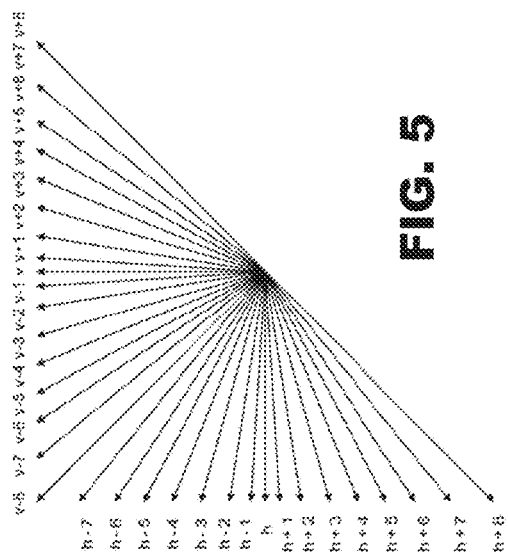
FIG. 5 illustrates exemplary directional modes for intra prediction suitable for use with an aspect of the present disclosure.

FIG. 5 represents candidate angular prediction directions that are utilized by HEVC in predicting image content for intra-coded pixel blocks. Aspects of the present disclosure leverage the angular prediction directions selected by an HEVC coder to derive image content for a predicted pixel block during intra-coding. HEVC support 33 directional modes for intra prediction. Other coding protocols support other directional modes; for example, the AV1 coding protocol supports 56 directional modes.

Figure 6:
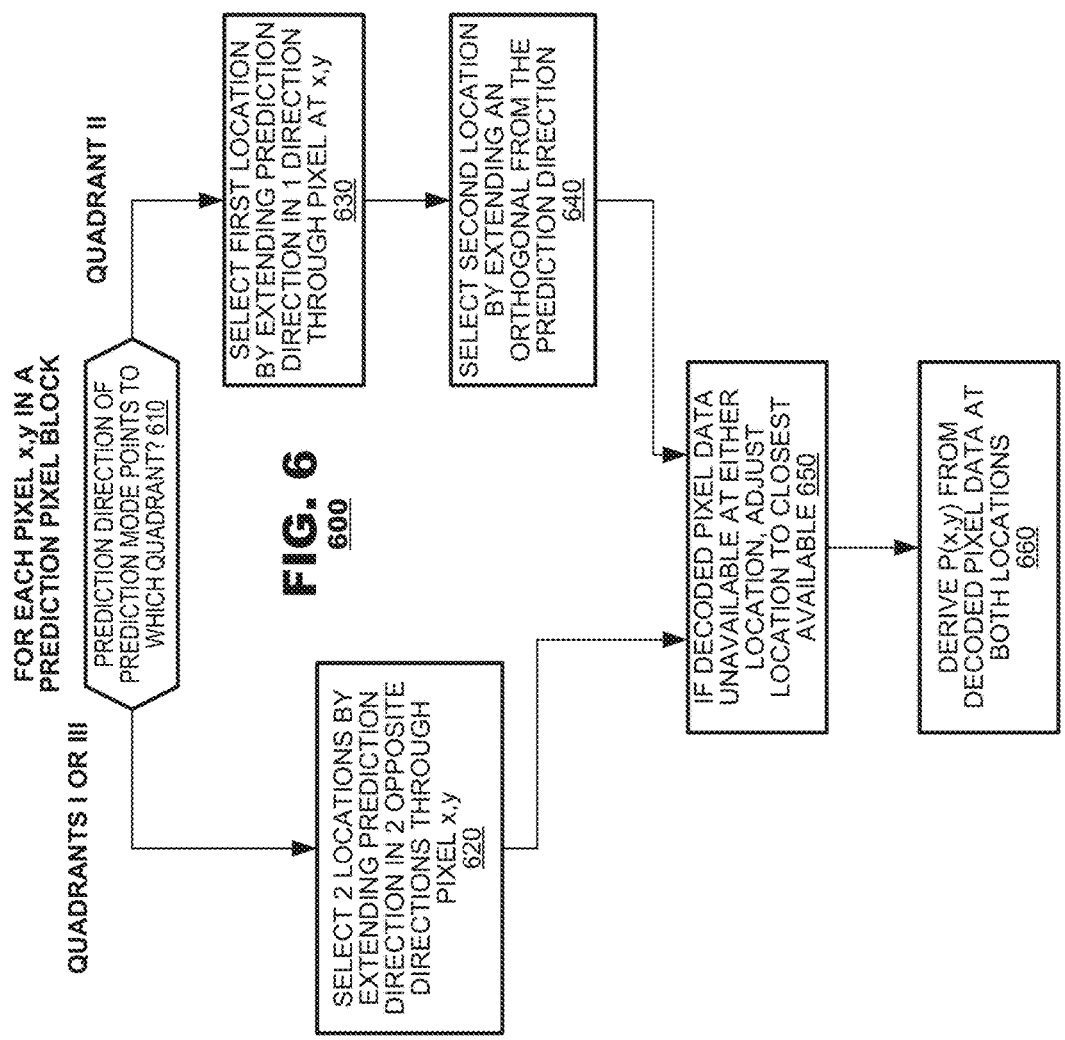
FIG. 6 illustrates a method according to an aspect of the present disclosure.

FIG. 6 illustrates a method 600 according to an aspect of the present disclosure. The method 600 may derive pixel values for each location x,y in a prediction pixel block and may find application in predictors applied in both the encoding systems (FIGS. 2, 17) and decoding systems (FIGS. 3, 18) discussed herein. The method 600 may begin by determining which quadrant of the Cartesian plane a prediction direction points toward (box 610). A prediction direction for a current pixel block may be identified by the prediction mode for the pixel block. For example, see the prediction directions for HEVC prediction modes depicted in FIG. 5. Using the top left corner of the current prediction block as the origin of a Cartesian plane, when the prediction direction points to either quadrant I (points up and right) or quadrant III (points down and left), then two locations are selected by extending the prediction direction through pixel x,y on opposite directions (box 620). For example, see FIGS. 7 and 8 for selection of locations A and B for a prediction direction pointing to quadrants I or III. Alternately, if the prediction direction points to quadrant II (points up and left), then a first location is selected by extending the prediction direction in only one direction through pixel x,y (box 630), and a second location is selected by extending in a direction that is orthogonal to the prediction direction from somewhere along the prediction direction (box 640). For example, see FIGS. 11-12 for selection of locations A and C for a prediction direction pointing to quadrants II.

After two locations are selected, if decoded pixel data is not available at either location, than the location with unavailable data may be adjusted to the closest location where decoded pixel data is available (box 650). A prediction P(x,y) of the pixel at location x,y in the prediction pixel block is derived from pixel data at or near both locations (box 650).

Figure 7:
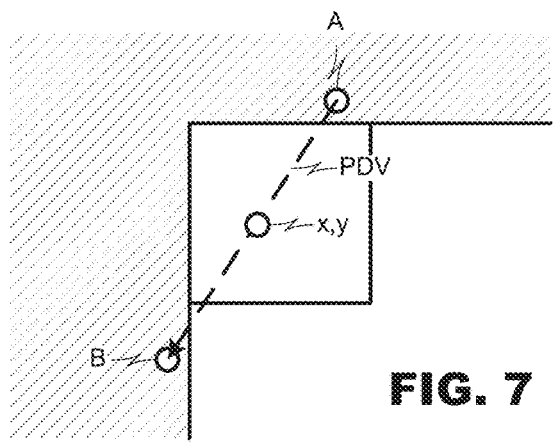
FIGS. 7-12 illustrate exemplary use cases suitable with the method of FIG. 6, according to aspects of the present disclosure.

FIGS. 7-12 illustrate the application of the method 600 in exemplary use cases. FIG. 7, for example, illustrates a prediction direction vector PDV pointing to quadrant I (points up and right). The PDV extends through a pixel location x,y to intersect decoded pixel data in two regions, designated A and B. In this example, a value for a pixel at location x,y may be derived from decoded pixel data in regions A and B. The cross hatch-areas in FIGS. 7-12 may indicate regions where the previously decoded pixel data is available and may be used as a prediction source for the pixel at location x,y.

Figure 8:
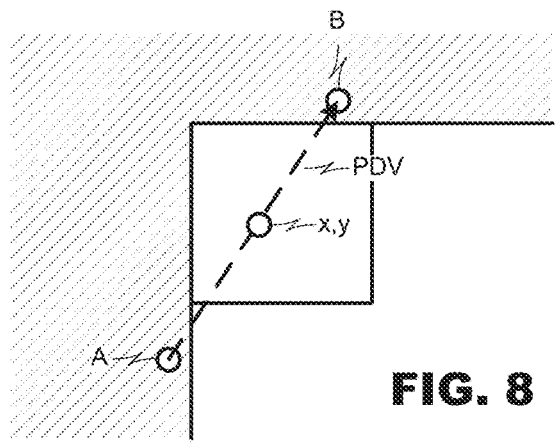

FIG. 8 illustrates another prediction direction vector PDV pointing to quadrant III (points down and left). The PDV extends through a pixel location x,y to intersect decoded pixel data in two regions, designated A and B. In this example, a value for a pixel at location x,y may be derived from decoded pixel data in regions A and B. This example illustrates the prediction direction vector PDV extending in an opposite direction (e.g., 180° offset) to the prediction PDV of FIG. 7.

Figure 9:
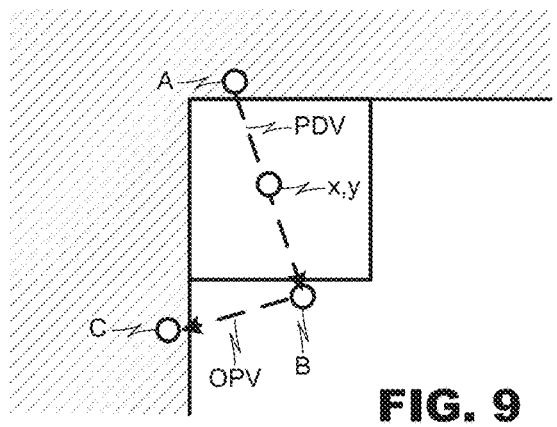
Figure 10:
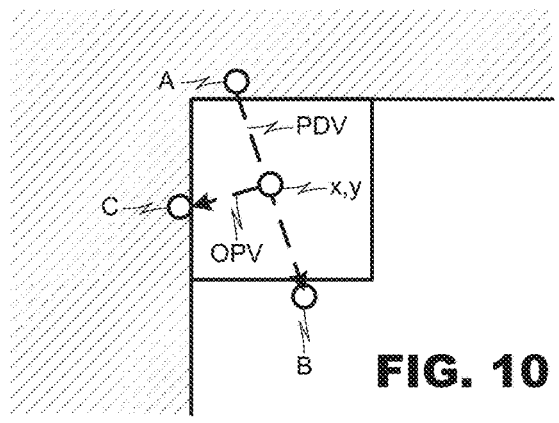

FIG. 9 illustrates a use case in which a prediction direction vector PDV points to quadrant II (points up and left) and intersects with an upper neighbor. The PDV extends through a pixel location x,y intersects decoded pixel data in only one region, designated A. Here, the operation of boxes 630-640 (FIG. 6) would be triggered. The method 600 would select a second region C of decoded pixel data according to an second prediction vector OPV that extends orthogonally to the prediction direction vector PDV that extends through the pixel location x,y. As discussed, the orthogonal prediction vector OPV may extend through a pixel location (designated B) immediately adjacent to an edge of the prediction pixel block along the prediction direction vector PDV or, as shown in FIG. 10, the orthogonal prediction vector OPV may extend through the location x,y. In the cases of FIGS. 9 and 10, region C may be located in a left-neighbor.

Figure 11:
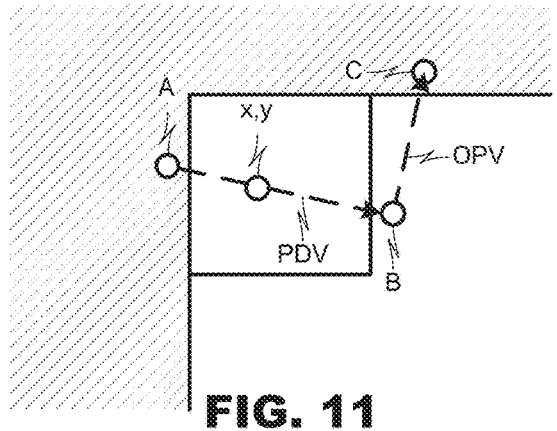
Figure 12:
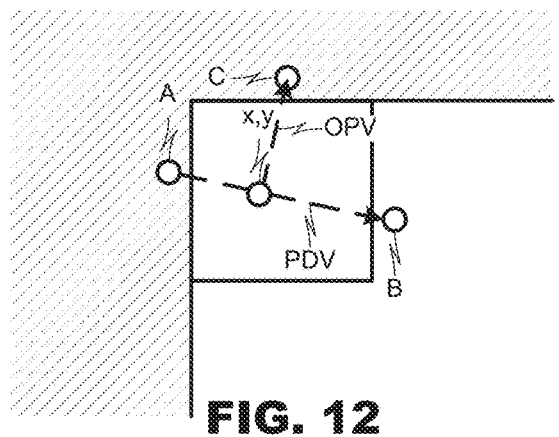

FIG. 11 illustrates a further use case in which a prediction direction vector PDV points to quadrant II (points up and left) and intersects with a left neighbor. The PDV extends through a pixel location x,y intersects decoded pixel data in only one region, designated A. Here, the operation of boxes 630-640 (FIG. 6) would be triggered. The method 600 would select a second region C of decoded pixel data according to a second prediction vector OPV that extends orthogonally to the prediction direction vector PDV that extends through the pixel location x,y. As discussed, the orthogonal prediction vector OPV may extend through a pixel location (designated B) immediately adjacent to an edge of the prediction pixel block along the prediction direction vector PDV or, as shown in FIG. 12, the orthogonal prediction vector OPV may extend through the location x,y. In the cases of FIGS. 11 and 12, region C may be located in a above-neighbor.

Once two source regions are selected, derivation of the pixel value at location x,y may be performed by combining pixel values from the source regions. The derivation may occur in a variety of ways. First, pixel values may be calculated by a weighted average of pixel values in the source regions, having the form:

$$P(x,y) = w * P_{reg1} + (1-w) * P_{reg2}, \text{ where}$$

$P_{reg1}$, $P_{reg2}$ are pixel values drawn from the two source regions, and the weight w is set according to relative distances of the respective source regions to the pixel location x,y. Optionally, the weight w may be set according to other factors, including spatial variance of pixel values in the source region (which may indicate the presence of edges, occlusions or other image content that suggests a pixel region should be more or less heavily weighted in computation), and/or temporal variance of pixel values in the source region.

In practice, the regions A, B, and/or C (FIGS. 7-12) from which source pixel data is drawn may represent pixel content at the edges of regions in which decoded pixel data is available. That is, when a source pixel region is located above a prediction pixel block, pixel data may be taken from a row of pixels immediately above the prediction pixel block's top edge. Similarly, when a source pixel region is located to the left of a prediction pixel block, pixel data may be taken from a column of pixels immediately to the left of the prediction pixel block's left-most edge. In practice, it will not always occur that a prediction direction vector PDV or an orthogonal prediction vector OPV will intersect pixel locations within the source row of pixels or a source column of pixels; in such cases, pixel values may be interpolated at non-integer locations within the source row or source column from neighboring pixel values.

Alternatively, a value of a source pixel region may be derived from a two-dimensional region of image content in which decoded pixel data is available. The method 600 may identify, as the source pixel region, a predetermined number of decoded pixel values along an edge of the decoded pixel data at which the prediction direction vector PDV or the orthogonal prediction vector OPV intercept the decoded pixel data. From the decoded pixel values, a source prediction value may be derived according to interpolation techniques such as bicubic, spline, tricubic, inpainting methods, and the like.

In another aspect of the present disclosure, prediction of a pixel value at a location x,y may be derived from a predicted DC value of the prediction block and pixel(s) neighboring the pixel block. The predicted value may be calculated by a weighted average of a DC prediction value for the predicted pixel block and from a reference pixel in an adjacent region, having the form:

$$P_{Pred}(x,y) = w * \text{pred\_DC} + (1-w) * P_{Src}, \text{ where}$$

pred_DC represents a DC prediction value of the predicted pixel block as determined by the intra-coding prediction selection, $P_{Src}$ represents a pixel value from a source region, and w represents a weighting applied to the values. This technique may find application in predictors applied in both the encoding systems (FIGS. 2, 17) and decoding systems (FIGS. 3, 18) discussed herein Predicted DC values are generated according to several coding protocols, such as the MPEG2, H.263, H.264/AVC, HEVC, VVC, and AV1 coding protocols. Source regions may be selected according to techniques described hereinbelow.

Figure 13:
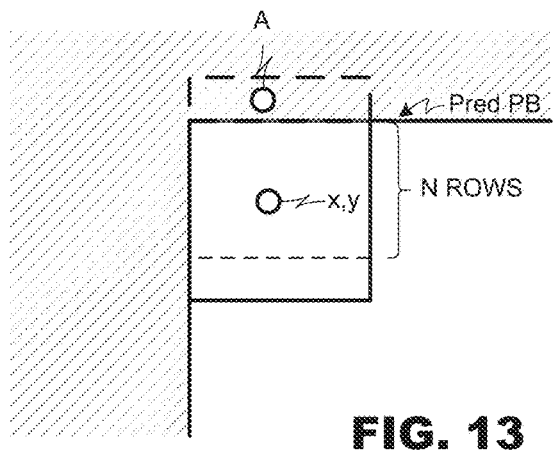
FIGS. 13-15 illustrate prediction pixel block derivation techniques according to aspects of the present disclosure.
Figure 14:
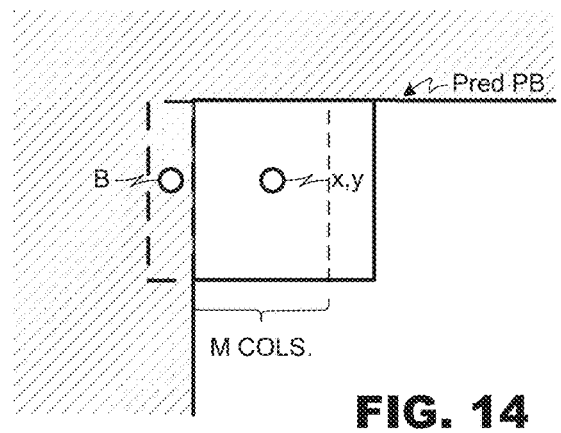

In a first aspect, shown in FIGS. 13 and 14, source regions may be selected according to a pixel's proximity to decoded pixel data that is available from previous coding processes. For example, a pixel may be located in a top-most N rows of a prediction pixel block, which places the pixel's location (x,y) within a predetermined distance of decoded pixel data available along a top edge of the prediction pixel block. In this circumstance, source pixel data (designated A in FIG. 13) may be selected as a pixel along a lower-most edge of decoded pixel data and within a common column as the pixel x,y.

In another example, illustrated in FIG. 14, a pixel may be within M columns of a left edge of the prediction pixel block, which places the pixel's location (x,y) within a predetermined distance of decoded pixel data available along the left edge of the prediction pixel block. In this circumstance, source pixel data (designated B in FIG. 14) may be selected as a pixel along a right-most edge of decoded pixel data and within a common row as the pixel x,y.

In the cases of FIGS. 13 and 14, the weight may be selected according to the pixel's distance from its source pixel A or B, as the case may be. For example, as the distance of the pixel from its source pixel increases, the weight's value increases which causes the contribution of the DC prediction value to increase in computation of the prediction value $P_{Pred}(x,y)$. Alternatively, weights could be predefined according to pixel locations within the prediction pixel block and/or neighboring pixels.

Figure 15:
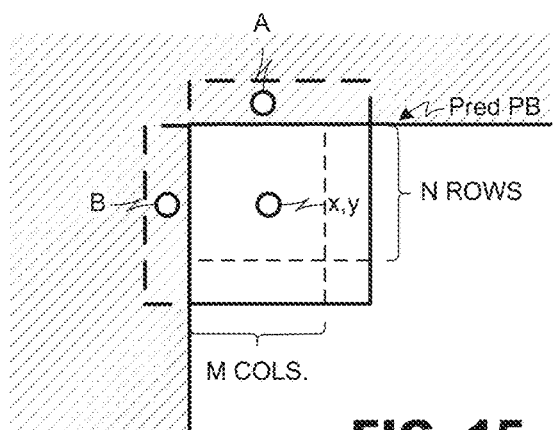

As shown in FIG. 15, aspects of the present disclosure may integrate the techniques illustrated in FIGS. 13 and 14 for pixels that are both within predetermined distances of both the top-most edge and the left-most edge of the prediction pixel block. In this instance, the predicted pixel value at location x,y may be calculated as:

$$P_{pred}(x,y) = (1-(w_1+w_2))*pred_{DC} + w_1*P_{Src1} = w_2*P_{Src2},$$

where $P_{Src1}$ and $P_{Src2}$ represent decoded source pixels from the pixel's column and row respectively and weights $w_1$ and $w_2$ are set according to the respective distances from the source pixels to the pixel being predicted.

In practice, designers of video coding systems may set the threshold values N and M to suit their individual application needs. For pixel locations that fall outside the regions denoted by the N and/or M thresholds, DC prediction may be applied or prediction may occur according to alternative prediction techniques, such as those set forth above in FIGS. 6-12.

In practice, source pixel data may be filtered before they are used for derivation of prediction pixel block data. Often the intra coding modes that are used to code data from which the source pixel data is decoded may determine the strength of filtering that is applied to the source pixel data. In an aspect, the activities of source prediction data may be included as factors to determine a strength of filtering to be applied to source pixel data.

Figure 16:
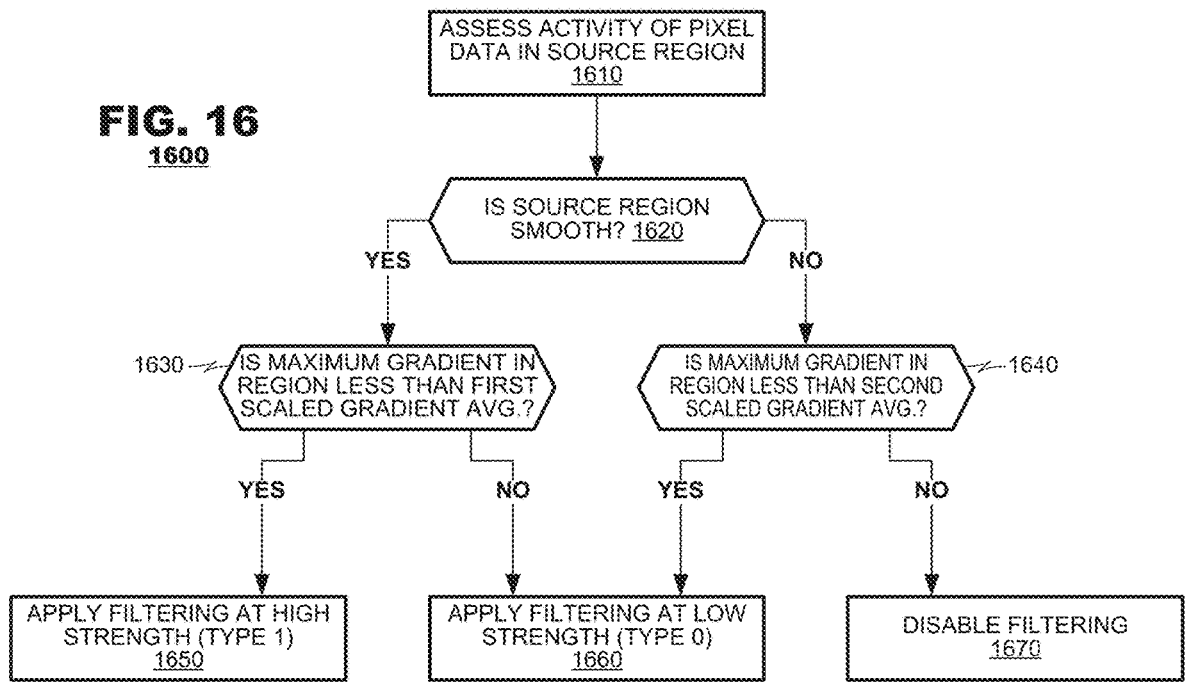
FIG. 16 illustrates a method according to another aspect of the present disclosure.

FIG. 16 illustrates a method 1600 according to an aspect of the present disclosure. The method 1600 may be applied to source pixel data for example along a top-most edge of a prediction pixel block or a left-most edge of a prediction pixel block to estimate a type of filtering to be applied to the source pixel data before deriving pixel values of a prediction pixel block. The method 1600 may begin by assessing activity of pixel data in the source region (box 1610) and classifying the source pixel region either as smooth or not smooth (box 1620). In an aspect, a source region may be determined to be smooth based on the prediction modes used to code the source region. For example, if the source region was coded with a prediction mode of "Smooth Mode," (or Planar Mode in HEVC) "Smooth V Mode," "Smooth H Mode," (as in AV1) or any of the smoothed directional/DC prediction methods disclosed herein (FIGS. 6-15), then the source region may be determined to be smooth (box 1620), and if other prediction modes are used then the source region may be determined to be not smooth.

Based on the smoothness estimate, the method 1600 may compare a maximum gradient of the source region to one of two scaled representations of the average gradient within the region (boxes 1630, 1640). The method 1600 may compare the maximum gradient to a first scaled representation of the average gradient (box 1630) when the region is classified as smooth. When the maximum gradient is less than the scaled representation of the average gradient, filtering may be applied to the source region at a relatively high strength (box 1650); for example, in a future standard or codec that might be based on the AV1 specification, filtering at Type 1 may be used. If at box (1630), the maximum gradient exceeds the scaled representation of the average gradient, then filtering may be applied to the source region at a relatively modest strength (box 1660); in a future standard or codec that might be based on the AV1 specification, filtering at Type 0 may be used. In an aspect, Type 1 filtering may be stronger than Type 0 filtering.

The method 1600 may compare the maximum gradient to a second scaled representation of the average gradient (box 1640) when the region is not classified as smooth. When the maximum gradient is less than the second scaled representation of the average gradient, filtering may be applied to the source region at a relatively modest filtering strength (box 1660); when the maximum gradient exceeds the scaled representation of the average gradient, then filtering may be omitted (box 1670).

In an aspect, gradient computation may be performed separately at each pixel position within a row or column of a source pixel region. For each source pixel R(i) in a region, a gradient value G(i) may be computed as:

$$G_i = |2*R(i) - R(i-1) - R(i+1)|,$$

Where R(i−1) and R(i+1) are pixels that neighbor pixel R(i) within the source row or the source column, as the case may be.

In an aspect, the tests to determine filter type in boxes 1630 and 1640 may be calculated according to many alternate techniques. For example, different filter lengths may be used to determine the gradients. Additionally, a gradient may be measured in various directions, including horizontally, vertically, and diagonally. In addition, multiple gradients could be considered at every pixel, along with multiple threshold tests.

Figure 17:
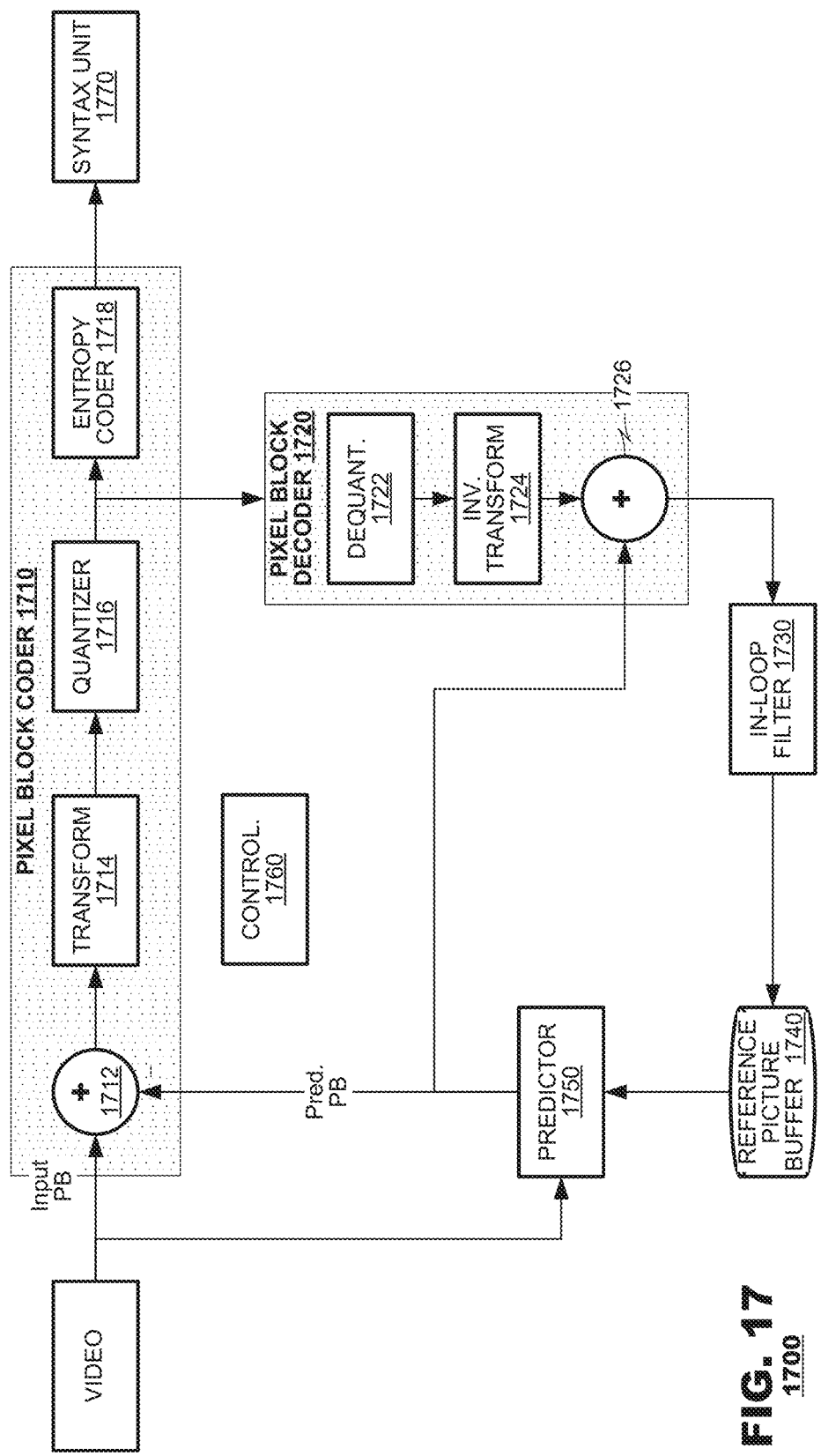
FIG. 17 is an example functional block diagram of coding system according to an aspect of the present disclosure.

FIG. 17 is a functional block diagram of a coding system 1700 according to an aspect of the present disclosure. The system 1700 may code input pixel blocks provided by a video source. The system 1700 may include a pixel block coder 1710, a pixel block decoder 1720, an in-loop filter system 1730, a reference picture buffer 1740, a predictor 1750, a controller 1760, and a syntax unit 1770. The predictor 1750 may generate a prediction pixel block for use by the pixel block coder 1710 and the pixel block decoder 1720. The prediction pixel block may be derived from previously-decoded image data stored in reference picture buffer 1740. In the case of an input pixel block to be coded by intra coding or combined inter- and intra-coding, the prediction pixel block may be derived by the techniques disclosed hereinabove.

The pixel block coder 1710 may code an input pixel block by predictive coding techniques and present coded pixel block data to the syntax unit 1770. The pixel block decoder 1720 may decode the coded pixel block data, generating decoded pixel block data therefrom. The in-loop filter 1730 may perform one or more filtering operations on the reconstructed frame. The reference picture buffer 1740 may store the filtered frame, where it may be used as a source of prediction of later-received pixel blocks. The syntax unit 1770 may assemble a data stream from the coded pixel block data, which conforms to a governing coding protocol.

The pixel block coder 1710 may include a subtractor 1712, a transform unit 1714, a quantizer 1716, and an entropy coder 1718. The pixel block coder 1710 may accept input pixel blocks at the subtractor 1712. The subtractor 1712 may receive prediction pixel blocks from the predictor 1750 and generate an array of pixel residuals therefrom representing a difference between the input pixel block and the prediction pixel block. The transform unit 1714 may apply a transform to the sample data output from the subtractor 1712, to convert data from the pixel domain to a domain of transform coefficients. The quantizer 1716 may perform quantization of transform coefficients output by the transform unit 1714. The quantizer 1716 may be a uniform or a non-uniform quantizer. The entropy coder 1718 may reduce the bandwidth of the output of the coefficient quantizer by losslessly coding the output, for example, by variable-length code words or using a context adaptive binary arithmetic coder.

The transform unit 1714 may operate in a variety of transform modes as determined by the controller 1760. For example, the transform unit 1714 may apply a discrete cosine transform (DCT), a discrete sine transform (DST), a Walsh-Hadamard transform, a Haar transform, a Daubechies wavelet transform, or the like. In an aspect, the controller 1760 may select a coding mode to be applied by the transform unit 1714, may configure the transform unit 1714 accordingly and may signal the coding mode in the coded video data, either expressly or impliedly. The selected coding mode may be included in a data stream of coded pixel block data and transmitted to a decoder (not shown).

The quantizer 1716 may operate according to a quantization parameter supplied by the controller 1760. In an aspect, the quantization parameter QP may be applied to the transform coefficients as a multi-value quantization parameter, which may vary, for example, across different coefficient locations within a transform-domain pixel block. Thus, the quantization parameter QP may be provided as a quantization parameter array. The quantization parameter may be included in a data stream of coded pixel block data and transmitted to a decoder (not shown).

The entropy coder 1718, as its name implies, may perform entropy coding of data output from the quantizer 1716. For example, the entropy coder 1718 may perform run length coding, Huffman coding, Golomb coding, Context Adaptive Binary Arithmetic Coding, and the like. Entropy coder 1718 may also entropy code various encoding parameters, such as quantization parameters QP, resampling parameters, prediction parameters, or deblocking parameters.

The pixel block decoder 1720 may invert coding operations of the pixel block coder 1710, and may operate on blocks of the same shape and size as pixel block coder 1710. For example, the pixel block decoder 1720 may include a dequantizer 1722, an inverse transform unit 1724, and an adder 1726. The pixel block decoder 1720 may take its input data from an output of the quantizer 1716. Although permissible, the pixel block decoder 1720 need not perform entropy decoding of entropy-coded data since entropy coding is a lossless event. The dequantizer 1722 may invert operations of the quantizer 1716 of the pixel block coder 1710. The dequantizer 1722 may perform uniform or non-uniform de-quantization. Similarly, the inverse transform unit 1724 may invert operations of the transform unit 1714. The dequantizer 1722 and the inverse transform unit 1724 may use the same quantization parameters and transform mode as their counterparts in the pixel block coder 1710. Quantization operations likely will truncate data in various respects and, therefore, data recovered by the dequantizer 1722 likely will possess coding errors when compared to the data presented to the quantizer 1716 in the pixel block coder 1710.

The adder 1726 may invert operations performed by the subtractor 1712. It may receive the same prediction pixel block from the predictor 1750 that the subtractor 1712 used in generating residual signals. The adder 1726 may add the prediction pixel block to reconstructed residual values output by the inverse transform unit 1724 and may output reconstructed pixel block data.

The in-loop filter 1730 may perform various filtering operations upon decoded picture data generated by the pixel block decoder 1720. That is, the in-loop filter 1730 may reassemble decoded frame data from the decoded pixel blocks obtained from the pixel block decoder 1720 and apply filtering operations, such as deblocking filtering and/or SAO filtering, upon the reassembled frames. Thus, the in-loop filter 1730 may perform filtering across pixel block boundaries.

The reference picture store 1740 may store filtered frame data for use in later prediction of other pixel blocks. Different types of prediction data may be made available to the predictor 1750 for different prediction modes. For example, for an input pixel block, an intra predictor takes a prediction reference(s) from previously decoded data of the same frame in which the input pixel block is located. In the case of raster scan ordering of pixel blocks, reference picture store 1740 may store previously decoded pixel blocks above and to the left of the block currently being encoded, and hence reference picture store 1740 may store previously decoded reference row(s) from blocks above the current block and may store previously decoded reference column(s) to the left of the current block. Thus, the reference picture store 1740 may store decoded pixel block data of each frame as it is coded. For the same input pixel block, an inter predictor may take a prediction reference from previously coded and decoded frame(s) that are designated as reference frames. Thus, the reference picture buffer 1740 may store these decoded reference frames.

Predictor 1750 may perform inter or intra prediction from one or more sources of reference image data. Prediction references are previously decoded image and may include reference row(s) above the current pixel block and reference columns to the left of the current pixel block. In the case of a DC prediction mode, a prediction reference may include an average of, or DC value from, a previously decoded pixel block. In the case of inter prediction, prediction references may also include image data from previously decoded frames.

In an aspect, predictor 1750 may operate on different types of blocks than block coder 1710 and block decoder 1720. A predicted picture store (not depicted) may collect multiple prediction blocks output by predictor 1750 for use by pixel block coder 1710 and decoder 1720. This may enable coder 1710 and decoder 1720 to operate on blocks of a different shape, size, or offset within a frame than is predicted by predictor 1750.

The controller 1760 may control overall operation of the coding system 1700. The controller 1760 may select operational parameters for the predictor 1750, including a prediction mode and/or prediction direction, reference source(s) for prediction, and weighting for smoothed prediction. Other prediction parameters may include lambda, quantization offsets, modes to be tested, search windows, distortion strategies, etc., for inter or intra prediction. As is relevant to the present discussion, when these operational parameters are selected and need to be present in the encoded bitstream, controller 1760 may provide those parameters to the entropy coder 1718 or the syntax unit 1770, which may include data representing those parameters in the data stream of coded video data output by the system 1700. The controller 1760 also may select parameters for the pixel block coder 1710 and decoder 1720, such as quantization parameters, and may include metadata identifying the parameters selected for each portion of coded data. Additionally, the controller 1760 may control other aspects of operation of the in-loop filter 1730.

During operation, the controller 1760 may revise operational parameters such as quantization parameters, prediction parameters, and deblocking parameters at different granularities of image data (different portion sizes of the image data), either on a per pixel block basis or on a larger granularity (for example, per frame, per slice, per LCU, CU, or another region). In an aspect, the deblocking filter parameters may be revised on a per-pixel basis within a coded frame. Similarly, a compressed bitstream output by syntax unit 1770 may include indications of operational parameters at different levels in a syntax hierarchy such as syntax levels corresponding to a pixel block, frame, slice, LCU/CTU, CU or another portion of the compressed bitstream.

Figure 18:
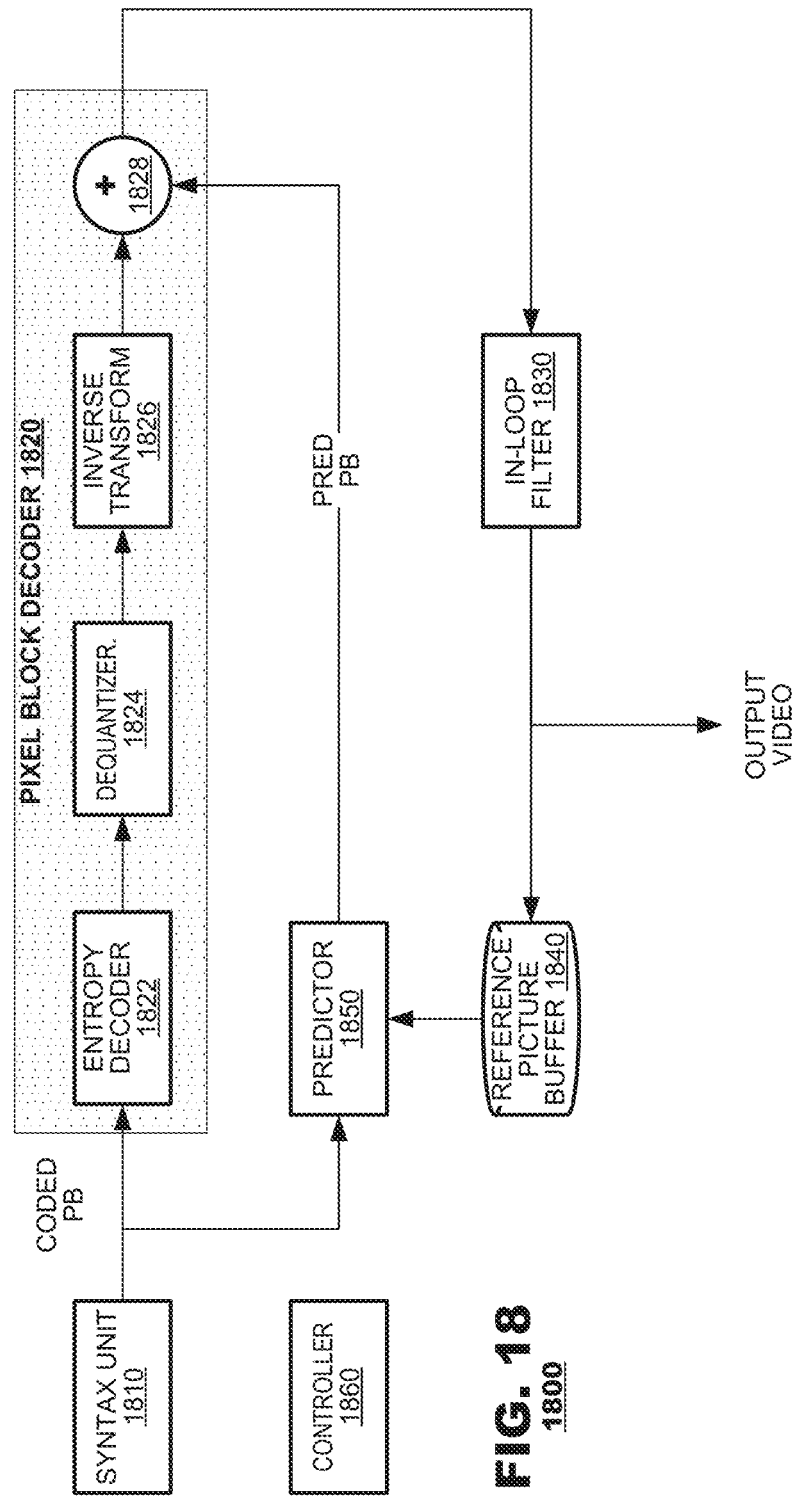
FIG. 18 is an example functional block diagram of an example decoding system.

FIG. 18 is a functional block diagram of a decoding system 1800 according to an aspect of the present disclosure. The decoding system 1800 may include a syntax unit 1810, a pixel block decoder 1820, an in-loop filter 1830, a reference picture buffer 1840, a predictor 1850, and a controller 1860. The syntax unit 1810 may receive a coded video data stream and may parse the coded data into its constituent parts. Data representing coding parameters may be furnished to the controller 1860, while data representing coded pixel blocks (the data output by the pixel block coder 1710 of FIG. 17) may be furnished to the pixel block decoder 1820. The predictor 1850 may generate a prediction pixel block from reference data available in the reference picture buffer 1840 according to coding parameter data provided in the coded video data. In the case of a coded pixel block coded by intra coding or combined inter- and intra-coding, the prediction pixel block may be derived by the techniques disclosed hereinabove. The prediction block may be supplied to the pixel block decoder 1820.

The pixel block decoder 1820 may invert coding operations applied by the pixel block coder 1710 (FIG. 17). The in-loop filter 1830 may collect pixel blocks output by the pixel block decoder 1820, assemble them into reconstructed frames, and filter the reconstructed frames. Filtering may be performed using the same techniques as applied by the in-loop filter 1730 of the encoder (FIG. 17). Filtered reconstructed frames may be output from the decoding system 1800 for further processing. Filtered reconstructed frames that are designated to serve as reference data also may be stored in the reference picture buffer 1840 for later use by predictor 1850.

The pixel block decoder 1820 may include an entropy decoder 1822, a dequantizer 1824, an inverse transform unit 1826, and an adder 1828. The entropy decoder 1822 may perform entropy decoding to invert processes performed by the entropy coder 1718 (FIG. 17). The dequantizer 1824 may invert operations of the quantizer 1816 of the pixel block coder 1710 (FIG. 17). Similarly, the inverse transform unit 1826 may invert operations of the transform unit 1714 (FIG. 17). They may use the quantization parameters QP and transform modes that are provided in the coded video data stream. Because quantization is likely to truncate data, the pixel blocks recovered by the dequantizer 1824 likely will possess coding errors when compared to the input pixel blocks presented to the pixel block coder 1710 of the encoder (FIG. 17).

The adder 1828 may invert operations performed by the subtractor 1710 (FIG. 17). It may receive a prediction pixel block from the predictor 1850 as determined by prediction references in the coded video data stream. The adder 1828 may add the prediction pixel block to reconstructed residual values output by the inverse transform unit 1826 and may output reconstructed pixel block data.

The in-loop filter 1830 may perform various filtering operations on recovered pixel block data as identified by the coded video data. In this manner, operation of the in-loop filter 1830 mimics operation of the counterpart in-loop filter 1730 of the encoder 1700 (FIG. 17).

The reference picture buffer 1840 may store filtered frame data for use in later prediction of other pixel blocks. The reference picture buffer 1840 may store whole decoded reference frames, and it may store a partially decoded frame as it is decoded for use in intra prediction, such as described above regarding reference picture store 1740 of the encoder 1700 (FIG. 17).

The controller 1860 may control overall operation of the coding system 1800. The controller 1860 may set operational parameters for the various elements of coding system 1800 based on parameters received in the coded video data stream. As is relevant to the present discussion, these operational parameters may include parameters for predictor 1850, in addition to other parameters for pixel block decoder 1820 and in-loop filter 1830. In an aspect, information indicating these operational parameters may be extracted from a compressed bitstream by syntax unit 1810. In another aspect, operational parameters such as prediction reference may be inferred from explicitly encoded syntax elements such as a prediction mode. As discussed, the operational parameters may vary at various granularities of image data and be communicated in and extracted from various levels of compressed bitstream syntax, for example, on a per pixel block basis, a per frame basis, a per slice basis, a per LCU/CU basis, or based on picture types of portions of the video.

Figure 19:
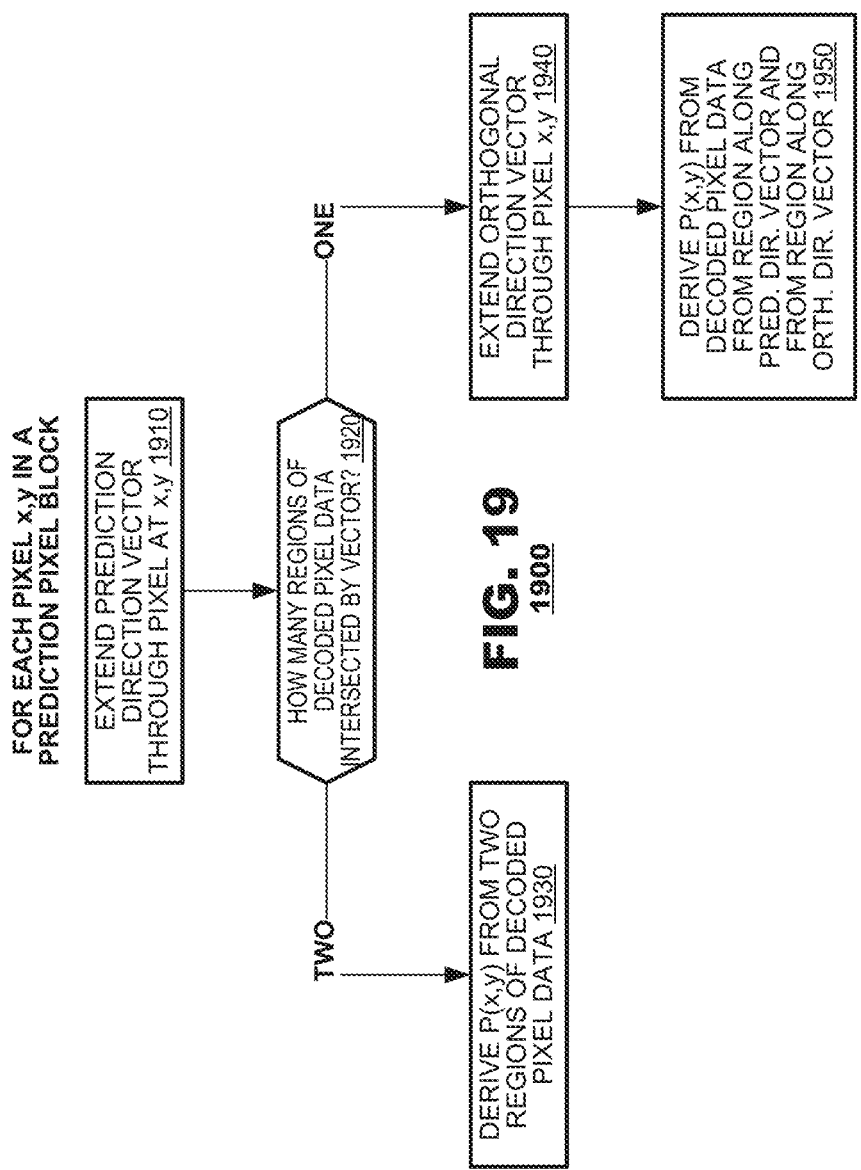
FIG. 19 illustrates a method according to an aspect of the present disclosure.

FIG. 19 illustrates a method 1900 according to an aspect of the present disclosure. The method 1900 may derive pixel values for each location x,y in a prediction pixel block and may find application in predictors applied in both the encoding systems (FIGS. 2, 17) and decoding systems (FIGS. 3, 18) discussed herein. The method 1900 may begin by extending a prediction direction vector through the pixel location x,y (box 1910). The method 1900 may determine how many regions of decoded pixel data are intersected by the extended vector (box 1920), either one or two. If the extended vector intersects two regions of decoded pixel data, then the method 1900 may derive a pixel value at location x,y from decoded pixel data in the two regions (box 1930).

If the extended vector intersects only one region of decoded pixel data, the method 1900 may extend a second vector that is orthogonal to the prediction direction vector (box 1940). The method may derive a pixel value at location x,y from a first region of decoded pixel data intersected by the prediction vector and from a second direction intersected by the orthogonal prediction vector (box 1950).

Figure 20:
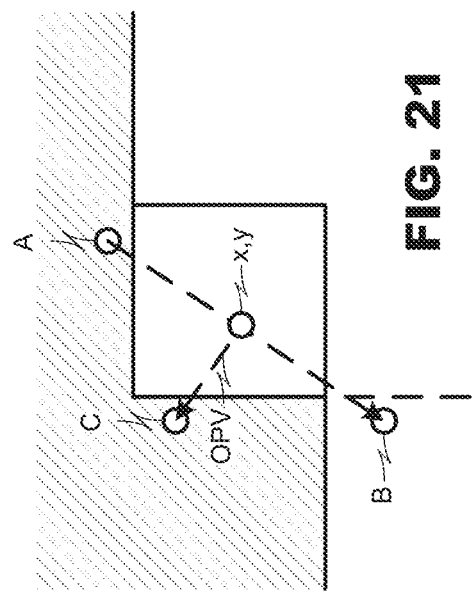
FIGS. 20-21 illustrate exemplary use cases suitable with the method of FIG. 19, according to aspects of the present disclosure.
Figure 21:
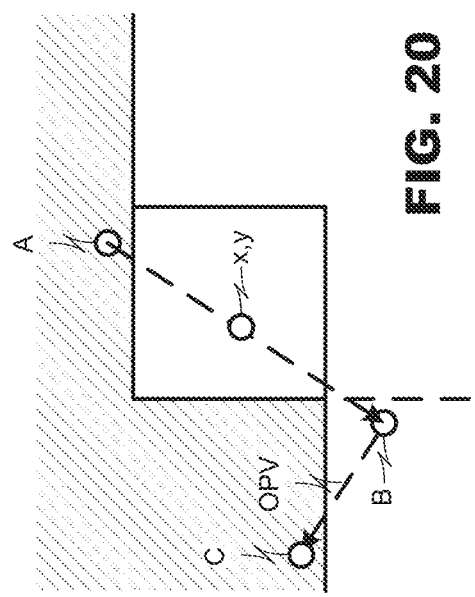

FIGS. 20 and 21 illustrate application of the method 1900 in exemplary use cases. FIG. 20 illustrates a use case in which a prediction direction vector PDV that extends through a pixel location x,y intersects decoded pixel data in only one region, designated A. In this example, decoded pixel data is not available in region B, which occurs at a spatial region below the reference pixel block being developed. In this example, the operation of boxes 1940-1950 (FIG. 19) would be triggered, and the method 1900 would select a second region C of decoded pixel data according to a second vector OPV drawn orthogonal to the first prediction direction vector PDV. In this example, the orthogonal prediction vector OPV is orthogonal to the prediction direction vector and extends through a location B, which represents a region of pixel data adjacent to an edge of a prediction pixel block being derived. The pixel value at location x,y would be derived from decoded pixel data available in regions A and C.

FIG. 21 illustrates another use case in which a prediction direction vector PDV that extends through a pixel location x,y intersects decoded pixel data in only one region, designated A. Here, again, decoded pixel data is not available in region B, which occurs at a spatial region below the reference pixel block being developed. Thus, the operation of boxes 1940-1950 (FIG. 19) would be triggered, and the method 1900 would select a second region C of decoded pixel data according to a second vector OPV drawn orthogonal to the first prediction direction vector PDV. In this example, the orthogonal prediction vector OPV is orthogonal to the prediction direction vector and extends through pixel location x,y. The pixel value at location x,y would be derived from decoded pixel data available in regions A and C.

Video coders and decoders may exchange video through channels in a variety of ways. They may communicate with each other via communication and/or computer networks as illustrated in FIG. 1. In still other applications, video coders may output video data to storage devices, such as electrical, magnetic and/or optical storage media, which may be provided to decoders sometime later. In such applications, the decoders may retrieve the coded video data from the storage devices and decode it.

The foregoing discussion has described operation of the embodiments of the present disclosure in the context of terminals that embody encoders and/or decoders. Commonly, these components are provided as electronic devices. They can be embodied in integrated circuits, such as application specific integrated circuits, field programmable gate arrays and/or digital signal processors. Alternatively, they can be embodied in computer programs that execute on personal computers, notebook computers, tablet computers, smartphones or computer servers. Such computer programs typically are stored in physical storage media such as electronic-, magnetic- and/or optically-based storage devices, where they are read to a processor under control of an operating system and executed. Similarly, decoders can be embodied in integrated circuits, such as application specific integrated circuits, field-programmable gate arrays and/or digital signal processors, or they can be embodied in computer programs that are stored by and executed on personal computers, notebook computers, tablet computers, smartphones or computer servers. Decoders commonly are packaged in consumer electronics devices, such as gaming systems, DVD players, portable media players and the like; and they also can be packaged in consumer software applications such as video games, browser-based media players and the like. And, of course, these components may be provided as hybrid systems that distribute functionality across dedicated hardware components and programmed general-purpose processors, as desired.

Several embodiments of the disclosure are specifically illustrated and/or described herein. However, it will be appreciated that modifications and variations of the disclosure are covered by the above teachings and within the purview of the appended claims without departing from the spirit and intended scope of the disclosure.

We claim:

1. An image coding method, comprising:
deriving a prediction pixel block for use in predictive coding in which:
a value for a first pixel location in the prediction pixel block is derived with a first technique from a blend of a predicted DC value of the prediction pixel block and at least one source pixel selected from a region of previously-decoded pixel data closest to the first pixel location, wherein the first pixel location is less than a threshold distance from the at least one source pixel, and the predicted DC value of the prediction pixel block is based on a DC value of a previously decoded rectangular pixel block and a value for a second pixel location in the prediction pixel block greater than the threshold distance from the at least one source pixel is derived with an alternate technique different from the first technique; and
coding an input pixel block differentially with reference to the prediction pixel block.

2. The method of claim 1, wherein, when the first pixel location is within a first threshold distance of a top edge of the prediction pixel block, the source pixel is selected as a pixel in a bottom-most row of previously decoded pixel data in a common column as the first pixel location.

3. The method of claim 1, wherein, when the first pixel location is within a second threshold distance of a left edge of the prediction pixel block, the source pixel is selected as a pixel in a right-most column of previously decoded pixel data in a common row as the first pixel location.

4. The method of claim 1, wherein, when the first pixel location is within threshold distances of both a top row of the prediction pixel block and a left-most column of the prediction pixel block, the value for the first pixel location is derived from a first source pixel in a bottom-most row of previously decoded pixel data in a common column as the first pixel location, a second source pixel in a right-most column of previously decoded pixel data in a common row as the first pixel location, and the predicted DC value of the prediction pixel block.

5. The method of claim 1, wherein relative contributions of the predicted DC value and the source pixel are weighted according to a distance between the first pixel location and a location of the source pixel.

6. An image decoding method, comprising:
deriving a prediction pixel block for use in predictive coding in which
a value for a first pixel location in the prediction pixel block is derived with a first technique from a blend of a predicted DC value of the prediction pixel block and at least one source pixel selected from a region of previously-decoded pixel data closest to the first pixel location, wherein the first pixel location is less than a threshold distance from the at least one source pixel, and the predicted DC value of the prediction pixel block is based on a DC value of a previously decoded rectangular pixel block, and
a value for a second pixel location in the prediction pixel block greater than the threshold distance from the at least one source pixel is derived with an alternate technique different from the first technique; and decoding a coded pixel block predictively with reference to the prediction pixel block.

7. The method of claim 6, wherein, when the first pixel location is within a first threshold distance of a top edge of the prediction pixel block, the source pixel is selected as a pixel in a bottom-most row of previously decoded pixel data in a common column as the first pixel location.

8. The method of claim 6, wherein, when the first pixel location is within a second threshold distance of a left edge of the prediction pixel block, the source pixel is selected as a pixel in a right-most column of previously decoded pixel data in a common row as the first pixel location.

9. The method of claim 6, wherein, when the first pixel location is within threshold distances of both a top row of the prediction pixel block and a left-most column of the prediction pixel block, the value for the first pixel location is derived from a first source pixel in a bottom-most row of previously decoded pixel data in a common column as the first pixel location and a second source pixel in a right-most column of previously decoded pixel data in a common row as the first pixel location.

10. The method of claim 6, wherein relative contributions of the predicted DC value and the source pixel are weighted according to a distance between the first pixel location and a location of the source pixel.

11. A non-transitory computer readable medium storing program instruction that, when executed by a processing device, cause the processing device to execute an image decoding method, comprising:
deriving a prediction pixel block for use in predictive coding in which
a value for a first pixel location in the prediction pixel block is derived with a first technique from a blend of a predicted DC value of the prediction pixel block and at least one source pixel selected from a region of previously-decoded pixel data closest to the first pixel location and the predicted DC value of the prediction pixel block is based on a DC value of a previously decoded rectangular pixel block, and
a value for a second pixel location in the prediction pixel block greater than the threshold distance from the at least one source pixel is derived with an alternate technique different from the first technique; and
decoding a coded pixel block predictively with reference to the prediction pixel block.

12. A decoding system, comprising:
a video decoder, having an input for coded pixel blocks, an input for a prediction pixel block, and an output for decoded pixel blocks,
a reference picture buffer to store decoded data assembled from the decoded pixel blocks, and
a predictor that, for pixel blocks to be coded by intra-coding, generates a prediction pixel block including
a value for a first pixel location in the prediction pixel block that is derived with a first technique from a blend of a predicted DC value of the prediction pixel block and at least one source pixel selected from a region of previously-decoded pixel data closest to the first pixel location, wherein the first pixel location is less than a threshold distance from the at least one source pixel and the predicted DC value of the prediction pixel block is based on a DC value of a previously decoded rectangular pixel block, and
a value for a second pixel location in the prediction pixel block greater than the threshold distance from the at least one source pixel is derived with an alternate technique different from the first technique.

13. The non-transitory computer readable medium of claim 11, wherein, when the first pixel location is within a first threshold distance of a top edge of the prediction pixel block, the source pixel is selected as a pixel in a bottom-most row of previously decoded pixel data in a common column as the first pixel location.

14. The non-transitory computer readable medium of claim 11, wherein, when the first pixel location is within a second threshold distance of a left edge of the prediction pixel block, the source pixel is selected as a pixel in a right-most column of previously decoded pixel data in a common row as the first pixel location.

15. The non-transitory computer readable medium of claim 11, wherein, when the first pixel location is within threshold distances of both a top row of the prediction pixel block and a left-most column of the prediction pixel block, the value for the first pixel location is derived from a first source pixel in a bottom-most row of previously decoded pixel data in a common column as the first pixel location and a second source pixel in a right-most column of previously decoded pixel data in a common row as the first pixel location.

16. The non-transitory computer readable medium of claim 11, wherein relative contributions of the predicted DC value and the source pixel are weighted according to a distance between the first pixel location and a location of the source pixel.

17. The decoding system of claim 12, wherein, when the first pixel location is within a first threshold distance of a top edge of the prediction pixel block, the source pixel is selected as a pixel in a bottom-most row of previously decoded pixel data in a common column as the pixel location.

18. The decoding system of claim 12, wherein, when the first pixel location is within a second threshold distance of a left edge of the prediction pixel block, the source pixel is selected as a pixel in a right-most column of previously decoded pixel data in a common row as the pixel location.

19. The decoding system of claim 12, wherein, when the pixel location is within threshold distances of both a top row of the prediction pixel block and a left-most column of the prediction pixel block, the value for the first pixel location is derived from a first source pixel in a bottom-most row of previously decoded pixel data in a common column as the pixel location and a second source pixel in a right-most column of previously decoded pixel data in a common row as the pixel location.

20. The decoding system of claim 12, wherein relative contributions of the predicted DC value and the source pixel are weighted according to a distance between the pixel location and a location of the source pixel.

21. A method of intra-predicting pixels for a prediction pixel block, comprising:
for a first pixel location that is within a first threshold distance of previously-decoded pixel data in a first direction and within a second threshold distance of previously-decoded data in a second direction orthogonal to the first direction, predicting data for the first pixel location according to a first weighted combination of a predicted DC value of the prediction pixel block, the previously-decoded pixel data in the first direction and the previously-decoded data in the second direction,
for a second pixel location that is within the first threshold distance of previously-decoded pixel data in the first direction but outside the second threshold distance of previously-decoded data in the second direction, predicting data for the second pixel location according to a second weighted combination of the predicted DC value of the prediction pixel block and previously-decoded pixel data in the first direction, for a third pixel location that is outside the first threshold distance of previously-decoded pixel data in the first direction but within the second threshold distance of previously-decoded data in the second direction, predicting data for the third pixel location according to a third weighted combination of the predicted DC value of the prediction pixel block and previously-decoded pixel data in the second direction, and for a fourth pixel location that is outside the first threshold distance of previously-decoded pixel data in the first direction and outside the second threshold distance of previously-decoded data in the second direction, predicting data for the four pixel location according to previously-decoded identified with reference to a prediction vector for the prediction pixel block.

* * * * *